H. L. BEACH.
CONTROL SYSTEM FOR ELECTRIC MOTORS.
APPLICATION FILED NOV. 8, 1907.
929,187.
Patented July 27, 1909.
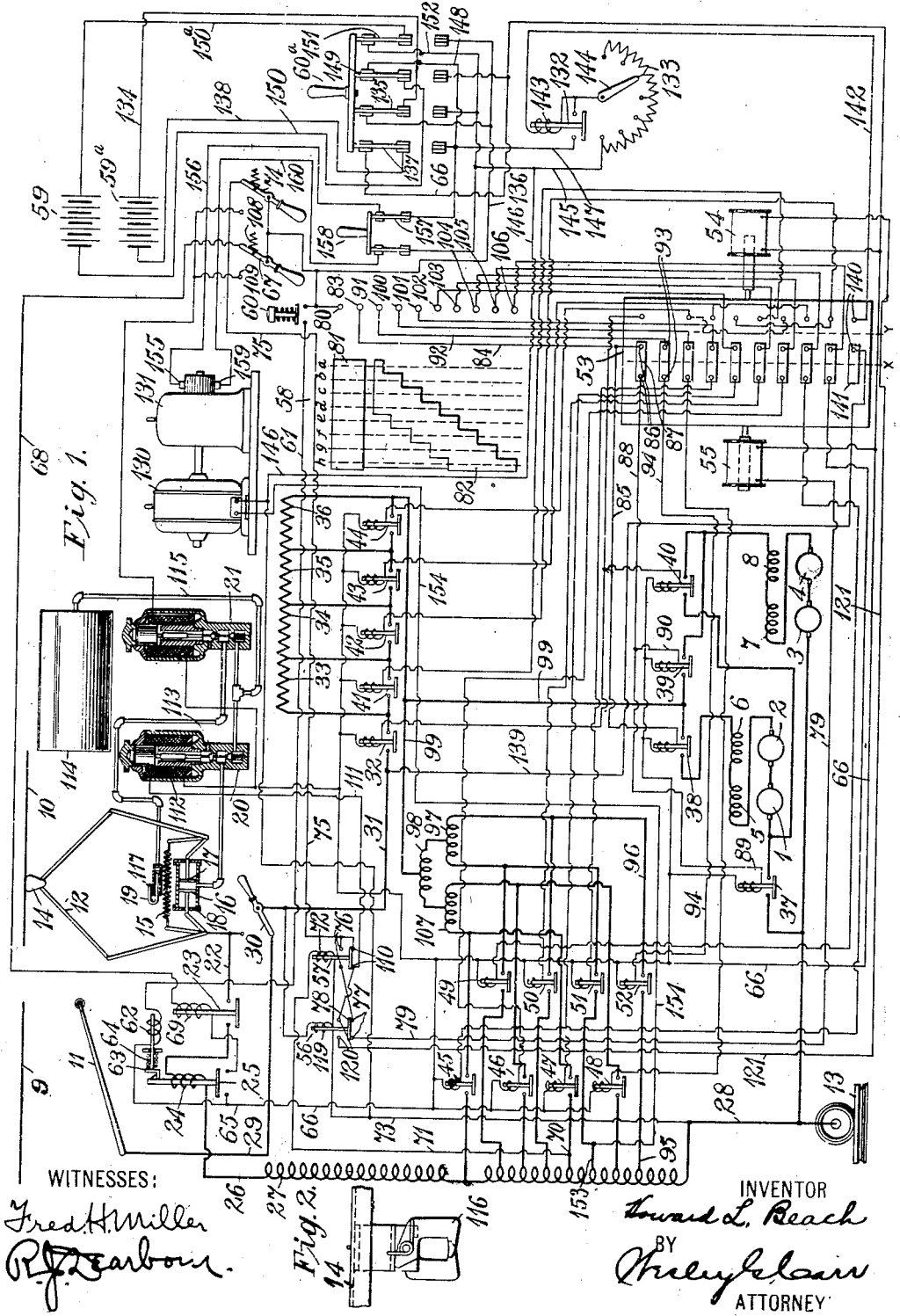
WITNESSES:
Fred H. Miller
R. J. Dearborn
INVENTOR
Howard L. Beach
BY
[signature]
ATTORNEY

UNITED STATES PATENT OFFICE.

HOWARD L. BEACH, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

CONTROL SYSTEM FOR ELECTRIC MOTORS.

No. 929,187.   Specification of Letters Patent.   Patented July 27, 1909.

Application filed November 8, 1907. Serial No. 401,271.

*To all whom it may concern:*

Be it known that I, HOWARD L. BEACH, a citizen of the United States, and a resident of Wilkinsburg, in the county of Allegheny and State of Pennsylvania, have invented a new and useful Improvement in Control Systems for Electric Motors, of which the following is a specification.

My invention relates to systems of electric motor control, and has special reference to the control of electric vehicle motors which are adapted to receive energy from either direct or alternating current sources.

The object of my invention is to provide a system of the class above indicated that shall be simple in arrangement and effective in operation and that shall embody secondary batteries for energizing the control circuits of the system and automatic means for adapting the main source of supply by conversion or voltage reduction, according as alternating or direct current is supplied to the motors, for charging the secondary batteries.

When the main circuits of motor control systems are supplied with energy from alternating current sources, the control circuits are often supplied with currents at relatively low voltages, the operating electro-magnets for the control switches being specially adapted for this kind of energy. If, however, the main circuits are supplied with direct currents, storage batteries are ordinarily employed for supplying energy to the control circuits in order that the operating magnets may be constructed for low voltages. The latter arrangement has also been used when the main circuits of the system are supplied from either direct or alternating current sources, the storage batteries being charged from direct current sources only.

In electric railroads where sections of material length are equipped with alternating current trolley conductors, it becomes desirable to provide suitable means for charging the batteries, whether the motors are supplied with energy from direct or from alternating current sources.

According to my present invention, I provide a well known means for converting alternating current to direct current, such as a motor-generator set or a rotary converter, other means for adapting the direct current main line potential for charging purposes and automatic means for selecting the suitable adapter in order that the battery may be charged at any time.

Figure 1 of the accompanying drawings is a diagrammatic view of a system arranged in accordance with my invention, and Fig. 2 is a sectional view of the alternating current collector shown in Fig. 1.

Referring to the drawings, a plurality of electric motors having armatures 1, 2, 3, and 4 field magnet windings 5, 6, 7, and 8 may be supplied with energy from direct or alternating current sources, through trolley conductors 9 and 10 and trolleys 11 and 12, the circuit being completed through a rail conductor 13. The direct current trolley 11 is controlled manually, but the alternating current trolley 12 which is of the pantograph type, comprises a contact shoe 14, a spring 15 which normally holds the shoe in engagement with the trolley conductor, lowering pistons 16 and 17 that operate in a cylinder 18, and a latch 19, and is governed by electro-magnetically actuated valves 20 and 21.

Alternating current energy is supplied directly from the trolley 12 through conductor 22, line switch 23, magnet winding 24 of a relay switch 25 and conductor 26 to one terminal of a transformer 27, the opposite terminal of the transformer being connected to the rail conductor 13 by a conductor 28.

Energy is supplied from the direct current trolley 11 through a conductor 29, switch 30, conductor 31 and line switch 32 to one terminal of a resistance comprising sections 33, 34, 35, and 36.

Motors 1 and 2 may be permanently connected together electrically and the motors 3 and 4 may be similarly connected so that each group may be considered as a single motor and the circuit connections of the groups may be varied from a series to a parallel relation and may be connected to, or disconnected from, a line by a plurality of independently-operated switches 37, 38, 39, and 40.

The amount of resistance included in the circuit may be varied by a series of switches 41, 42, 43, and 44 and the alternating current voltage applied to the motors is governed by a group of independently-operated switches 45 to 52, inclusive.

A change-over switch 53, which is operated selectively by electro-magnets 54 and 55, is adapted to arrange the control circuit for operating the system by alternating or direct currents, and the position of the switch is determined by selective relays 56 and 57.

The independently operated switches and the line switches, which are referred to above, are severally provided with operating electro-magnets and are governed by a master controller 58, energy being supplied for the control switches from storage batteries 59 and 59$^a$. The batteries 59 and 59$^a$ are similar to each other, so that one may be connected at all times to the control circuit of the system while the other is connected to a charging circuit, the circuit connections being governed by a four-pole double-throw switch 60$^a$. The charging circuit is supplied with energy either from a motor-generator set, comprising an alternating current motor 130 and a direct current generator 131, or from the direct current supply circuit 9, connections being established, as hereinafter set forth, through a relay switch 132 and a variable resistance 133.

The operation of, and the circuit connections for, the system are as follows: Assuming that the alternating current trolley 12 engages its supply conductor 10, and that the various switches of the system occupy the positions shown in the drawing, line switches 23 and 32 being open, the motors may be accelerated by first closing a re-set switch 60 and by moving the master controller 58 to occupy positions $a, b, c, d, e, f, g$, and $h$, successively. As soon as switch 60 is closed, a control circuit is established from the storage battery 59$^a$ through conductor 134, switch blade 135 of switch 60$^a$, conductor 136, switch 60, conductor 61, magnet winding 62, conductor 65, negative conductor 66, switch blade 137 and conductor 138 to the negative terminal of the battery. The magnet winding 62, when energized, releases a latch 63, which is operated by a spring 64, and effects the closure of the switch 25, which completes a control circuit from the battery through a switch 67, a conductor 68, an operating magnet winding 69 of the line switch 23, switch 25 and conductor 65 to the negative conductor 66. As soon as the line switch 23 is closed by the energized magnet winding 69, a main circuit is established from alternating current supply conductor 10 through the trolley 12, conductor 22, line switch 23, overload release coil 24 of the switch 25 and conductor 26 to one terminal of the auto-transformer 27, the opposite terminal of the transformer being connected to the rail conductor 13 by a conductor 28. The holding circuit of the line switch 23 is maintained through the switch 25, except under overload conditions, the alternating current circuit being normally made and interrupted by the engagement or disengagement of the trolley with or from the supply line conductor.

When the transformer 27 is energized, as above indicated, current is supplied from a low-voltage tap 70 through a conductor 71 to a magnet winding 72, from which point the circuit is completed through conductors 73 and 28 to return circuit conductor 13. When energized, the magnet winding 72 raises the switch 57, and a circuit is then completed from conductor 136 through a switch 74, conductor 75, contact fingers 76 of the switch 57, contact members 77 (which are bridged by the contact member 78 of the switch 56) and conductor 79 to magnet winding 55 of the change-over switch 53, circuit being completed from this point through the negative conductor 66. The change-over switch 53 is moved to occupy position $x$ by the magnet winding 55, when energized, in order that the motors may be supplied with alternating current energy.

If the master controller 58 is moved to occupy position $a$, energy is supplied from conductor 136 through contact finger 80 to contact members 81 and 82, a circuit being continued from contact finger 81 through contact finger 83, conductor 84, and conductor 85 to the magnet winding of the switch 38, the opposite terminal of this winding being connected to negative conductor 66. A second circuit is established from the conductor 84, through contact fingers 86 (that are bridged by a contact member 87 when the change-over switch 53 occupies position $x$), to conductor 88, the circuit being divided from this point so that energy is supplied through conductors 89 and 90 to the magnet windings of switches 37 and 39.

The contact member 82 is engaged by a contact finger 91 and energy is supplied from this finger through conductor 92, contact fingers 93, and conductor 94 to the magnet winding of the switch 52, the circuit being completed, as before, through the negative conductor 66. In this way, the switches 38, 39, 37, and 52 are closed and alternating current energy is supplied from a low-voltage tap 95 of the transformer 27, through switch 52, conductor 96, preventive coils 97 and 98, and conductor 99 to the switches 38 and 39, two branch circuits being completed from this point to the negative rail conductor 13, one of them being established through switch 38, field magnet windings 6 and 5, motor armatures 2 and 1 and switch 37, and the other being established through switch 39, field magnet windings 8 and 7 and motor armatures 4 and 3.

If the master controller is moved to successively occupy positions $b, c, d, e, f, g$, and $h$, switches 48, 51, 47, 50, 46, 49, and 45 are successively closed, circuits being established through contact fingers 100, 101, 102, 103, 104, 105, and 106, which move successively into engagement with the contact member 82.

It will be observed that switches 52, 48, 51, and 47 are all closed at one time and then, as the switch 50 is closed, the switch 52 is permitted to open, and, as the switch 46 is closed, the switch 48 opens, and so on, four of the switches being closed at one time. The voltage variations are accomplished, without at any time interrupting the circuit or directly short-circuiting any of the transformer turns, by the use of three preventive coils, 97, 98, and 107 which are manipulated as illustrated and described in Patent No. 834,525, granted October 30, 1906, to the Westinghouse Electric & Manufacturing Company, as assignee of Ray P. Jackson.

If it is desired to render the apparatus on the vehicle electrically dead, the switch 67 may be moved temporarily, in opposition to a spring 108, into contact with a finger 109, thereby interrupting the circuit which was formerly established through the magnet winding 69 of the line switch 23. The magnet winding 72 being deënergized, because energy is cut off from the transformer, the switch 57 drops to its lower position and a circuit is then established from a conductor 75 through contact fingers 110 and conductor 111 to magnet winding 112 of the magnet valve 20.

The valve 20 closes an exhaust port 113, when its magnet is energized, and thus admits fluid-pressure from a storage reservoir 114 through a pipe 115 to cylinder 18 between the pistons 16 and 17, which are immediately separated, thereby lowering the contact shoe 14, in opposition to the spring 15.

The contact shoe 14 is provided with a spring catch 116, as shown in Fig. 2 of the drawings, that engages a hook projection 117 on the latch 19. The same lowering action of the trolley may be effected automatically when the trolley circuit is interrupted by the separation of the car wheels from the rails, in case of accident, or by the normal passing of the trolley shoe onto a dead section for the purpose of changing from alternating to direct current operation.

Assuming that the alternating current trolley 12 is lowered and that the master controller 58 is in its "off" position, if the direct current trolley 11 is now moved into engagement with a direct current supply conductor 9, energy is first supplied through a conductor 29 and switch 30 to magnet winding 119 of the relay switch 56, a circuit being completed through the track rail 13. The winding 119 being thus energized, the relay switch is raised and a control circuit is completed from the conductor 136, through switch 74, conductor 75, contact fingers 110 of the switch 57, contact fingers 120 (that are engaged by contact number 78) and conductor 121 to operating magnet 54 of the change-over switch 53, which is then moved to position $y$. If the master controller is again moved to occupy positions $a$ to $h$, inclusive, the motors may be supplied with energy from the direct current source, the resistance 33, which is at first included in the circuit, being gradually reduced, as the motor is accelerated. The operation of this portion of the system, together with that of the complete system, in changing from direct current to alternating current, or vice versa, is clearly set forth in detail in my co-pending application, Serial No. 394,746, filed September 26, 1907, consequently, I deem it unnecessary to include a further description of the same herein.

If the switch 60$^a$ occupies the position indicated in the drawing and the change-over switch 53 occupies position $y$, so that direct current may be supplied to the system, energy is supplied from the conductor 9 through conductor 29, switch 30, conductor 31, conductor 39, contact fingers 140 (which are bridged by contact member 141 when the change-over switch occupies the position $y$), conductor 142, magnet winding 143 of relay switch 132, movable contact arm 144 of resistance 133 and conductor 145, conductor 146, and conductors 73 and 28 to the negative rail conductor 13.

The magnet winding 143, when energized, closes relay switch 132 whereupon a circuit is completed from conductor 142, through magnet winding 143, switch 132, conductors 147 and 148, switch blade 149, and conductor 150, to one terminal of the battery 59, the other terminal of the battery being connected through conductor 150$^a$, switch blade 151, and conductor 152 to conductor 146, from which point a circuit is completed to the negative rail conductor 13, as above indicated. Thus, the line voltage reduced by the resistance of magnet winding 143, which may be made of any suitable value, is applied to the battery 59, which is charged accordingly.

If the change-over switch 53 occupies position $x$, indicating that the motor circuits are supplied with energy from the alternating current circuit 10 and that the transformer 27 is energized, current is supplied from an intermediate tap 153 of the transformer, through conductor 154 to the motor 130, the opposite terminal of the motor being connected to the negative rail conductor 13 through conductor 146, as above indicated.

The motor 130, when energized, drives the direct current generator 131, which will then deliver energy from a positive commutator brush 155 through conductor 156 and a blade 157 of a switch 158, conductor 147, switch 130 blade 149 and conductor 150 to one terminal of the battery 59, as above indicated. The opposite commutator brush 159 is connected by conductor 160, the other blade of switch 158, conductor 152, switch blade 151 and conductor 150ª to form a battery charging circuit. The battery 59 is thus charged with suitable energy, provided the direct current generator is properly designed and propelled, irrespective of the kind of energy supplied to the main circuits of the system.

When the position of the four-pole double-throw switch 60ª is reversed, the battery 59 will be utilized for supplying energy to the control circuits of the system, while the battery 59ª will then be connected to the charging circuit and will receive energy from one of the two sources hereinbefore indicated, according to the condition of the transformer 27 and the position of the change-over switch 53.

It is evident that variations in the circuit connections shown in the drawings may be effected within the scope of my invention, and I desire that only such limitations shall be imposed as are indicated in the appended claims.

I claim as my invention:

1. In a control system, the combination with a plurality of motors, control switches therefor, operating magnets for the switches, and secondary batteries to energize the magnets, of a plurality of means for charging the batteries from unlike sources of energy, and automatic means for selecting one of said means.

2. In a control system, the combination with dissimilar supply circuits, electric motors adapted to receive energy from either circuit, control switches therefor, operating magnets for the switches, and secondary batteries for energizing the magnets, of a plurality of means for adapting the energy of the supply circuits for charging the batteries, and automatic means dependent upon the energy supplied to the motors for selecting the suitable adapting means.

3. In a control system, the combination with alternating and direct current supply circuits, electric motors adapted to receive energy from either supply circuit, electrically governed control switches for determining the speed and direction of rotation of the motors, and secondary batteries for energizing the control circuits, of a plurality of means for adapting the supply circuit energies for charging the batteries, and selective means, dependent upon the kind of energy supplied to the motors, for automatically supplying suitable current to the batteries.

4. In a control system, the combination with electric motors, supply circuits and control circuits therefor, secondary batteries for the control circuits, and a charging circuit for the batteries, of dynamo-electric mechanism for adapting the energy of one supply circuit for charging the batteries, and means for automatically connecting the other supply circuit to the charging circuit when energy is supplied therefrom to the motors.

5. In a control system for electric vehicles, the combination with electric propelling motors, alternating and direct current supply circuits therefor, motor control circuits and secondary batteries therefor, a charging circuit for the batteries, and a switching device for connecting one of the batteries to the control circuits and the other to the charging circuit, of means for adapting the energy received from the alternating current source for charging the battery, and other means for adapting the direct current source for charging the battery, and automatic means for selecting one of the adapting means, according as alternating or direct current energy is supplied to the motors.

6. In a control system for electric vehicles, the combination with alternating and direct current supply circuits, electric propelling motors, secondary batteries and motor control circuits supplied therefrom, of a motor generator set for adapting the energy received from the alternating current source for charging the battery, a change-over switch for effecting the proper control circuit connections for motor operation by alternating or direct currents, and a relay switch dependent upon the position of the change-over switch for automatically supplying direct current energy for charging the battery.

7. In a control system, the combination with dissimilar supply circuits, electric motors adapted to be operated therefrom, a change-over switch for connecting the motors to one or the other of the circuits, and operating electro-magnets for the change-over switch, of secondary batteries to energize the magnets, and means dependent upon the position of the change-over switch for automatically supplying suitable current to the batteries.

8. In a control system, the combination with alternating and direct current supply circuits, electric motors capable of being operated from either source and a change-over switch for governing the motor connections, of actuating electro-magnets for the change-over switch, secondary batteries for energizing the electro-magnets, and means dependent upon the position of the change-over switch for automatically supplying suitable current to the batteries.

In testimony whereof, I have hereunto subscribed my name this 30th day of Oct., 1907.

HOWARD L. BEACH.

Witnesses:
 WILLIAM COOPER,
 BIRNEY HINES.